United States Patent
Dubkov et al.

(10) Patent No.: US 8,820,050 B2
(45) Date of Patent: Sep. 2, 2014

(54) METHOD FOR MINIMIZING AMMONIA SLIP FROM SCR CATALYSTS

(75) Inventors: Alexey A. Dubkov, Aachen (DE); Mario Balenovic, Waalre (NL); Jan Harmsen, Simpelveld (NL); Robert Ukropec, Aachen (DE); Brendan Patrick Carberry, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 13/523,054

(22) Filed: Jun. 14, 2012

(65) Prior Publication Data

US 2013/0000278 A1   Jan. 3, 2013

(30) Foreign Application Priority Data

Jun. 30, 2011   (EP) .................................. 11172069

(51) Int. Cl.
*F01N 3/20* (2006.01)

(52) U.S. Cl.
CPC ........... *F01N 3/208* (2013.01); *F01N 2560/021* (2013.01); *Y02T 10/24* (2013.01); *F01N 2610/02* (2013.01); *F01N 2900/1616* (2013.01)
USPC .................... 60/285; 60/274; 60/276; 60/277; 60/278; 60/280; 60/286; 60/295; 60/297; 60/301; 60/311

(58) Field of Classification Search
USPC ........... 60/274, 276, 277, 278, 280, 285, 286, 60/295, 297, 301, 311
See application file for complete search history.

(56) References Cited

U.S. PATENT DOCUMENTS

| | | | |
|---|---|---|---|
| 5,628,186 | A | 5/1997 | Schmelz |
| 5,950,422 | A | 9/1999 | Dölling |
| 6,119,448 | A | 9/2000 | Emmerling et al. |
| 7,200,990 | B2 | 4/2007 | Gabrielsson et al. |
| 7,497,076 | B2 | 3/2009 | Funk et al. |
| 7,613,561 | B1 | 11/2009 | Steward et al. |

(Continued)

FOREIGN PATENT DOCUMENTS

WO   WO 2010079592 A1 *   7/2010

OTHER PUBLICATIONS

ISA European Patent Office, Search Report of EP11172069.4, Dec. 23, 2011, Netherlands, 5 pages.

*Primary Examiner* — Thomas Denion
*Assistant Examiner* — Jorge Leon, Jr.
(74) *Attorney, Agent, or Firm* — Julia Voutyras; Alleman Hall McCoy Russell & Tuttle LLP (57) ABSTRACT

Embodiments for reducing ammonia slip are provided. In one example, a method for reduction of ammonia emissions from an engine exhaust gas aftertreatment device with an SCR catalyst comprises determining a concentration of NOx and/or ammonia in the exhaust gas aftertreatment device, comparing a determined value of NOx and/or ammonia concentration with a nominal value for NOx and ammonia, respectively, and if an actual or shortly forecasted ammonia concentration is above the respective nominal value, triggering engine conditions with higher exhaust NOx concentration. In this way, ammonia slip may be reduced without degrading fuel economy.

11 Claims, 4 Drawing Sheets

(56) References Cited

U.S. PATENT DOCUMENTS

| | | |
|---|---|---|
| 7,722,845 B2 | 5/2010 | Caudle et al. |
| 7,780,934 B2 | 8/2010 | Minkara |
| 2009/0301066 A1* | 12/2009 | Sindano et al. ............... 60/286 |
| 2011/0023462 A1* | 2/2011 | Kurtz et al. ................... 60/286 |
| 2011/0072798 A1* | 3/2011 | Herman ......................... 60/286 |
| 2011/0162350 A1* | 7/2011 | Ponnathpur .................... 60/274 |
| 2011/0265457 A1* | 11/2011 | Sato .............................. 60/285 |
| 2012/0085081 A1* | 4/2012 | Mohammed et al. ......... 60/274 |

\* cited by examiner

FIG. 5

METHOD FOR MINIMIZING AMMONIA SLIP FROM SCR CATALYSTS

RELATED APPLICATIONS

The present application claims priority to European Patent Application Number 11172069.4, filed on Jun. 30, 2011, the entire contents of which are hereby incorporated by reference for all purposes.

FIELD

The current disclosure is related to a method and system for reduction of ammonia emissions from a combustion engine exhaust gas aftertreatment device with an SCR catalyst.

BACKGROUND AND SUMMARY

In recent times, internal combustion engine aftertreatment devices have been provided with catalytic systems to reduce NOx, which are based on the recombination reaction of NOx with ammonia to nitrogen and water on the SCR (Selective Catalytic Reduction) catalyst. The required ammonia is typically provided by an external source, like AdBlue®, which is a water-based solution of urea. Alternatively, ammonia could be in situ synthesized by a special catalyst from the NOx in exhaust gas. No matter which of the before mentioned methods is applied to provide ammonia in a particular exhaust gas aftertreatment device, it is difficult to control the generation rate or dosage of appropriate ammonia levels, in particular during different operating conditions of the engine.

Besides decreasing the NOx emissions from internal combustion engines, such as the diesel engine according to EU 6 and further legislations, it is also important to minimize emissions of reduction agents (e.g. ammonia). In other words, it makes no sense to provide a system to reduce NOx which on the other hand expels a different type of emissions. This task is becoming a challenge, because NOx selective reduction catalysts (SCR) are good adsorbents for ammonia, and unreacted ammonia could slip out of the catalyst during operation. This is in particular observed at transient stages, when exhaust gas flow rate and temperature are rapidly increased, for example during acceleration of the vehicle.

Several strategies have been presented in order to lower the ammonia slip. One method is based on measuring the concentration of NO and $NO_2$ in the feed gas from the diesel engine to control the selective catalytic reaction. Such a method is disclosed in U.S. Pat. No. 7,613,561 B1. Based on the concentration of both components, exhaust gas flow rate and temperature, the amount of ammonia needed for the conversion of NO and $NO_2$ is calculated via a control unit.

A further method is presented in U.S. Pat. No. 7,497,076 B1 describing an emission control system which is provided for an engine to reduce NOx emissions. The system includes an ammonia injector, a controller for controlling the ammonia injector and a catalyst, wherein the controller includes a transmitter for transmitting information regarding the amount of ammonia used and the amount of NOx reduced.

In U.S. Pat. No. 5,628,186 another method for addition of a reducing agent is described. According to this publication, the addition of the reducing agent is controlled by the detection of operation parameters from the engine and a catalyst. This is followed by a step in which the required amount of ammonia is determined from NOx measurements. The ammonia injection is then adjusted based upon the catalyst performance. Similar methods are described in U.S. Pat. No. 6,119,448, U.S. Pat. No. 5,950,422 and U.S. Pat. No. 7,200,990. In all cases, calculations for the addition of an amount of reductant are used in order to improve NOx conversion and to prevent detrimental leakage of the reductant into the environment.

Another approach is presented in U.S. Pat. No. 7,722,845 B2 and U.S. Pat. No. 7,780,934 B2. In these publications, an ammonia oxidation catalyst is provided downstream of an SCR-catalyst in order to prevent reductant leak into the environment. This additional catalyst contains larger amounts of platinum group metals. Consequently, this additional catalyst makes the aftertreatment device even more expensive and should therefore be avoided.

To summarize, in spite of a great number of methods dealing with control of reductant injection and avoiding the leak of the reductant to the environment, there is still the problem to control ammonia slip, especially at transient conditions, when a rapid increase of exhaust gas flow rate and temperature occurs.

Accordingly, a method for reduction of ammonia emissions from an engine exhaust gas aftertreatment device with an SCR catalyst is provided. The method comprises determining a concentration of NOx and/or ammonia in the exhaust gas aftertreatment device, comparing a determined value of NOx and/or ammonia concentration with a nominal value for NOx and ammonia, respectively, and if an actual or shortly forecasted ammonia concentration is above the respective nominal value, triggering engine conditions with a higher exhaust NOx concentration.

In this way, based on detected ammonia levels being above a nominal value, engine conditions may be adjusted to increase engine-out NOx emissions. The extra NOx in the exhaust may react with the ammonia in the exhaust gas aftertreatment device, thus lowering ammonia slip. Therefore, the ammonia slip from an engine exhaust gas aftertreatment device can be reduced in any operating condition while maintaining a low NOx level, without significant increase of the costs.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

In engine systems that operate with relatively lean combustion, such as diesel engines, high levels of NOx are produced. To control these NOx emissions, the engine system may include a selective catalyst reduction (SCR) device configured to convert NOx utilizing an injected reductant such as ammonia or urea. While SCR devices are effective at reducing NOx emissions, under some conditions, excess ammonia may be released from the devices. To control this ammonia slip, engine-out NOx levels may be increased by reducing an EGR amount, for example. The excess NOx present in the exhaust at the SCR device may react with the excess ammonia, reducing the amount of ammonia slip. The increase in engine NOx emissions may be controlled such that tailpipe NOx emissions downstream of the SCR device do not increase above a desired threshold.

The idea behind this disclosure is that it has been found that the occurrence of ammonia slip can be considered as a lack of NOx in the exhaust gas; in other words, one can conclude that ammonia slip under these conditions occurs in SCR-systems due to an insufficient amount of the reactant to react with desorbed ammonia, i.e. due the lack of NOx. While all recent methods deal with reducing the ammonia amount directly, the current disclosure intervenes with the operation conditions of the engine so that a higher level of NOx is produced in order to balance the NOx to ammonia ratio in such a way that after their reaction finally very low concentrations of both substances leave the exhaust pipe.

A risk of having an ammonia concentration above the respected value could be for example—because the total amount of ammonia stored on the catalyst is found to be too high, or because other parameters or operation conditions of the SCR catalyst (temperature, mass flow etc.) have an unfavourable trend.

Figure 1:
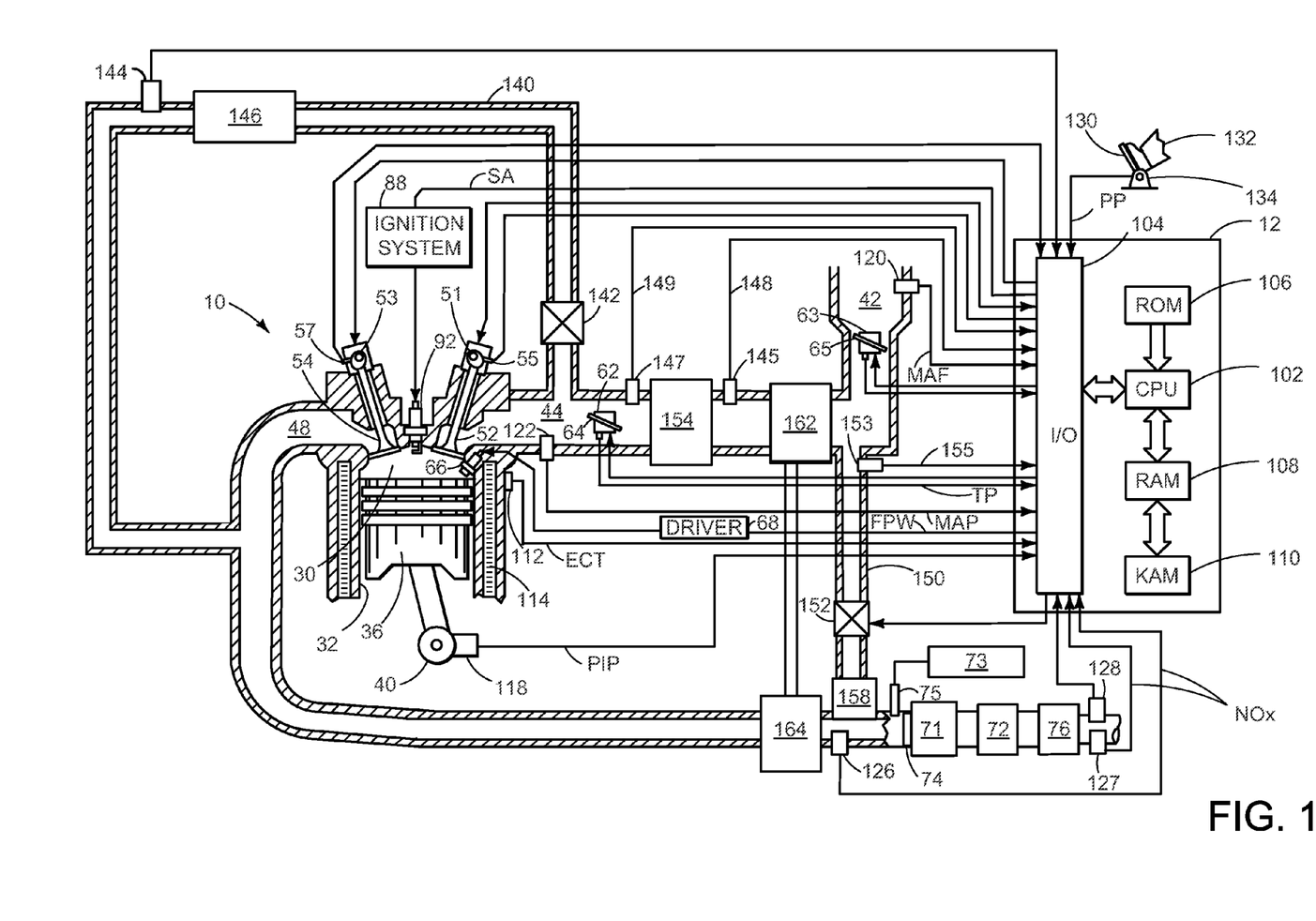
FIG. 1 is a schematic diagram of single cylinder of a multi-cylinder engine.
Figure 4:
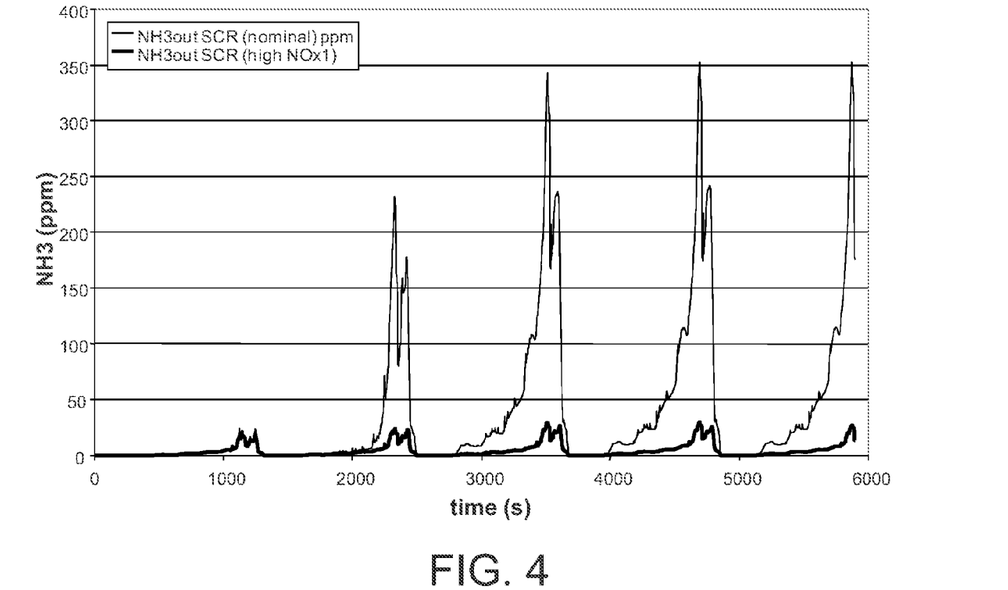
FIG. 4 is an example graph illustrating $NH_3$ slip during NEDC at nominal and increased levels of NOx.
Figure 5:
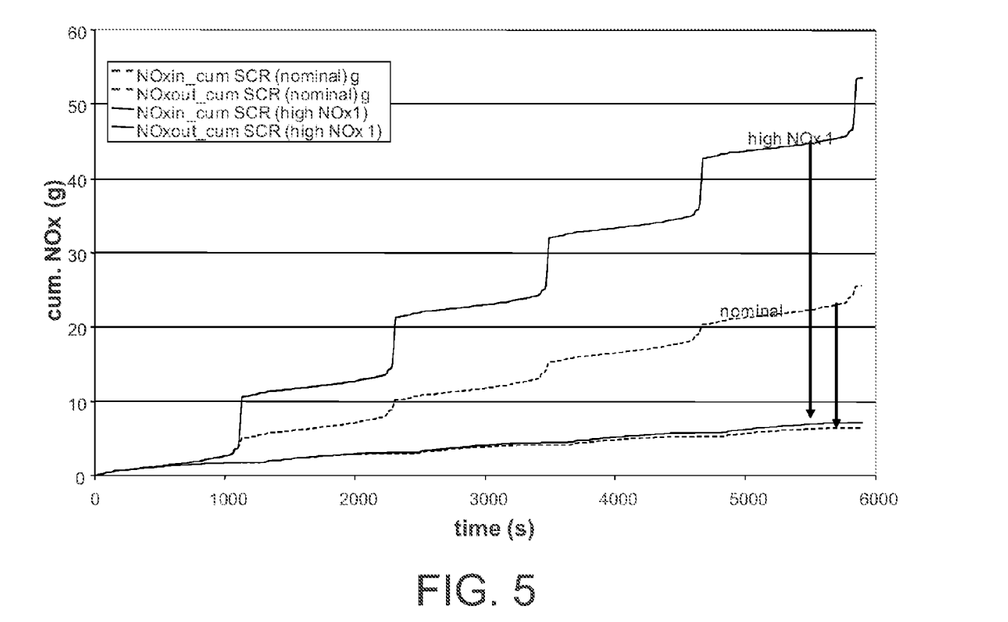
FIG. 5 is an example graph illustrating cumulative tailpipe NOx during NEDC at nominal and increased levels of NOx.

The inventive method and system can be used in many applications, such as passenger and commercial vehicles with diesel-driven engines, gasoline-driven engines, etc. FIG. 1 is an example engine including an SCR device and a controller for carrying out the methods of FIGS. 2-3. FIGS. 4 and 5 illustrate example ammonia levels and NOx levels during execution of the methods of FIGS. 2-3.

Turning now to FIG. 1, it shows a schematic diagram of one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside combustion chamber 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may open and close according to lobes of intake cam 51. Similarly, exhaust valve 54 may open and close according to lobes of exhaust cam 53. Phase of intake cam 51 and exhaust cam 53 may be varied with respect to crankshaft 40. Alternatively, the variable valve actuator may be electro hydraulic or any other conceivable mechanism to enable valve actuation. During some conditions, controller 12 may vary the signals provided to actuators coupled to intake cam 51 and exhaust cam 53 to control the opening and closing timing of the respective intake and exhaust valves. The position of intake valve 52 and exhaust valve 54 may be determined by valve position sensors 55 and 57, respectively. In alternative embodiments, one or more of the intake and exhaust valves may be actuated by one or more electrical actuators, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30, for example in order to control NOx production. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_R$, HC, or CO sensor. In one embodiment, the exhaust gas sensor 126 may be a NOx sensor configured to provide an indication of engine out NOx levels, e.g., NOx levels in the exhaust downstream of the engine and upstream of any emission control devices.

Emission control devices 71, 72, and 76 are shown arranged along exhaust passage 48 downstream of exhaust gas sensor 126. In the depicted embodiment, device 71 may be a selective catalytic reduction (SCR) system, while devices 72 and 76 may be a diesel oxidation catalyst (DOC), diesel particulate filter (DPF), three way catalyst (TWC), $NO_X$ trap, various other emission control devices, or combinations thereof. For example, device 72 may be a DOC and device 76 may be a DPF. In some embodiments, DPF 76 may be located downstream of SCR 71 and DOC 72 (as shown in FIG. 1), while in other embodiments, DPF 76 may be positioned upstream of DOC 72. Alternative arrangements are also possible in some embodiments, such as DOC 72 and/or DPF 76 being arranged upstream of SCR 71. If device 71 is an SCR system, a reductant tank 73 may be present to store reductant, such as urea or $NH_3$. The tank 73 may be coupled to an injector 75 to inject reductant into the exhaust upstream of the device 71 or into the device 71 in order to reduce NOx in the device 71. Further, a mixer 74 may be provided to ensure adequate mixing of the reductant within the exhaust stream. Urea may be injected in proportion to an amount of engine feedgas NOx entering the SCR. An additional NOx sensor 127 may be present downstream of the devices 71, 72 and 76 to provide an indication of the efficiency of the devices, by comparing the downstream NOx reading from sensor 127 to the upstream NOx reading from sensor 126. Further, in some embodiments, an ammonia sensor 128 may be present downstream of devices 71, 72, and 76 to provide an indication of ammonia slip past the SCR.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

To minimize the ammonia slip, the controller 12 may include instructions for predicting the catalyst conditions, the level of ammonia fill, and employing a control method as a tool to keep optimum operation conditions for the catalyst, feed of reductant (ammonia), and concentration of NOx in the gas feed. This may include determining an amount of ammonia slip past the SCR 71 based on a signal from the ammonia sensor 128. If the amount of ammonia slip is above a threshold, the amount of EGR routed to the engine may be decreased in order to increase NOx emissions entering the SCR 71. The increased NOx may react with the excess ammonia in the SCR 71, reducing ammonia slip. The degree of reduction of the EGR may be controlled based on feedback from a downstream NOx sensor 127, in order to maintain NOx emissions to the atmosphere below a suitable threshold. In addition to reducing EGR, fuel injection quantity and/or timing may be adjusted to increase NOx. Additionally, the amount of boost pressure provided by the turbocharger may be adjusted.

The current disclosure is consequently also directed to a system for reduction of ammonia emissions, the system comprising a combustion engine exhaust gas aftertreatment device with an SCR catalyst, and a control device including instructions for determining the concentration of NOx and/or ammonia in the exhaust gas aftertreatment device, comparing the determined value of NOx and/or ammonia concentration with a nominal value for NOx and ammonia, respectively, and triggering engine conditions such that a higher concentration of NOx in the exhaust gas is produced when the ammonia concentration is above the respective nominal value.

The configuration of the present disclosure can be combined with other measures for minimizing emissions, like the dosing control of reducing agent (urea-water solution, solid urea, ammonia, etc.), which are known. Additionally, the level of oxidizing reagent may be controlled. Such combined control strategies allow minimal slip of both reagents, which represents in this case minimal emissions.

The method and apparatus, respectively, described herein may utilize measured and/or model-predicted levels of the NOx and/or ammonia emissions in the feed gas. In other words, one possibility for the determination of the concentration of NOx and/or ammonia is to directly measure these concentrations in the exhaust gas stream. For such measurements, respective NOx and/or ammonia sensors are provided in the exhaust gas system.

Independent from the determination of the NOx and/or ammonia concentrations, other parameters of the exhaust gas stream can be measured, such as the exhaust gas temperature and/or the flow rate.

Alternatively to the measurement of NOx and/or ammonia concentrations, the determination of the NOx and/or ammonia concentrations may be carried out by calculating expected respective concentrations from a model-calculation under consideration of the measured exhaust gas temperature and/or the flow rate. Such data can be determined on a test stand for each type of engine in combination with a particular aftertreatment device individually for a plurality of operating conditions. The more data are gathered, the more precise the prediction from the model-calculation gets. The model-calculation may provide a predicted, or shortly forecasted, level of ammonia slip. The shortly forecasted amount of ammonia slip may be the amount of ammonia slip predicted to occur within a subsequent span of time, such as within one second, five seconds, one engine cycle, ten engine cycles, etc.

In any case, the measuring of the concentration of NOx, ammonia, exhaust gas temperature and/or the flow rate may be carried out upstream and/or downstream of SCR-catalyst and/or inside the SCR-catalyst. If the ammonia concentration is measured, the respective sensor should be positioned downstream of the SCR-catalyst.

According to an embodiment of this disclosure, the triggering of the engine conditions comprises the reduction or switching off of an exhaust gas recirculation (EGR) system typically presented in many combustion engines. Additionally there can also be a change in injection quantities and timing as well as boost pressure to achieve desired NOx change.

In the following, the functionality of the system is explained. During operation, the system determines a possible ammonia slip. This is done by determining the NOx and/or ammonia concentrations in the exhaust gas system. As soon as excessive ammonia causing the potential ammonia slip has been detected or predicted, the engine is switched to an operation mode in which a larger known amount of NOx is produced. This is done in such a way that the produced quantities of NOx correspond to what is just required to react with the desorbing ammonia, such that the ammonia slip is reduced without increasing NOx emissions, compared to the baseline case.

Figure 2:
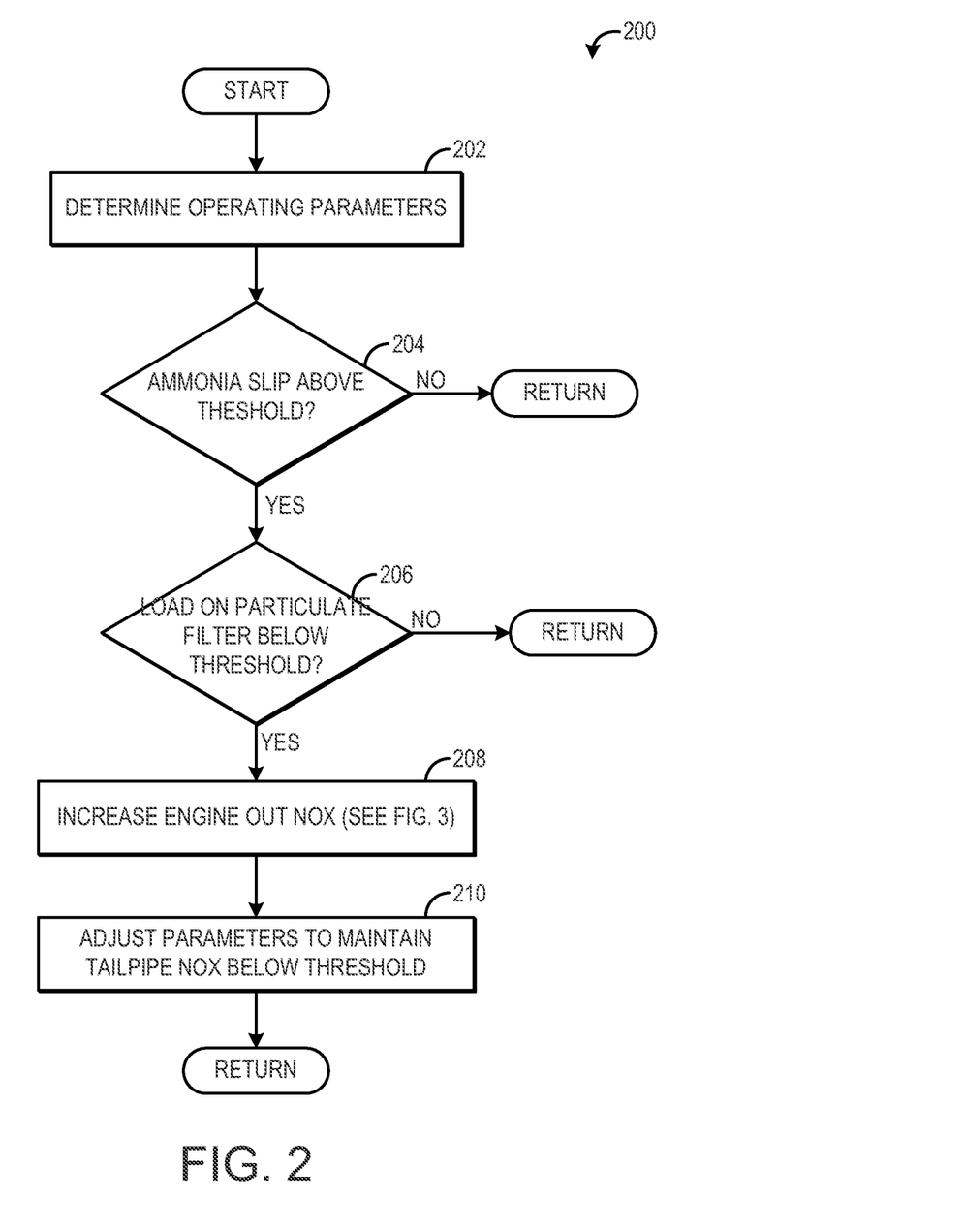
FIG. 2 is a flow chart illustrating a method for reducing ammonia slip according to an embodiment of the present disclosure.

FIG. 2 illustrates a method 200 for reducing ammonia slip. Method 200 may be carried out by controller 12 according to instructions stored thereon. Method 200 comprises, at 202, determining engine operating parameters. The engine operating parameters may include engine out NOx levels determined from sensor 126, tailpipe NOx levels determined from sensor 127, tailpipe ammonia levels from sensor 128, exhaust gas temperature and/or SCR temperature, and exhaust mass flow. Other operating parameters may also be determined, such as engine speed, engine load, etc.

At 204, it is determined if the level of ammonia slip past the SCR device exceeds a threshold. As explained previously, the SCR device may utilize ammonia to convert NOx emissions in the exhaust. However, if an excess of ammonia is present in the SCR, it may be released, causing ammonia slip. The level of ammonia slip may be determined based on feedback from ammonia sensor 128. In other embodiments, ammonia slip may be determined based on feedback from NOx sensor 127, which may detect both NOx levels and ammonia levels. Additionally, the level of ammonia slip may be a function of exhaust gas temperature and mass flow. Further, in other embodiments, the ammonia slip may be determined by a model that utilizes inputs such as engine speed and load, exhaust gas temperature, mass flow, NOx levels, and reductant injection amount (e.g., the amount of ammonia or urea injected into the SCR device) to predict ammonia slip levels.

The threshold level of ammonia slip may be a suitable threshold. It may be a fixed threshold, such that it does not change regardless of conditions. The threshold may be zero so that any level of ammonia slip exceeds the threshold, or the threshold may be a regulated ammonia emissions level. In some embodiments, the threshold may vary based on operating parameters. For example, a higher level of ammonia slip may be tolerated during conditions of low exhaust gas temperature, or other conditions in which NOx conversion is at lower-than maximum efficiency.

If the level of ammonia slip does not exceed the threshold, method 200 returns to maintain engine-out NOx at current levels. If the level does exceed the threshold, method 200 proceeds to 206 to determine if the load on a particulate filter in the exhaust system is below a threshold. As explained previously, in order to mitigate ammonia slip, engine parameters may be adjusted to increase engine out NOx. However, these adjustments may also cause an increase in particulates produced during combustion. The particulate filter is configured to trap the particulates and periodically burn the particulates off. If the particulate filter already includes a relatively high particulate load, it may not be able to tolerate the additional particulate matter produced, thus increasing exhaust backpressure and/or particulate emissions. The particulate load threshold may be a suitable threshold above which additional particulates may not be tolerated. Thus, if the load on the particulate exceeds a threshold, method 200 returns to maintain engine-out NOx levels at the current level. If the load on the particulate filter does not exceed a threshold, method 200 proceeds to 208 to increase engine out NOx levels, which will be explained in more detail with respect to FIG. 3. Certain engine operating parameters may be adjusted to increase engine out NOx. However, as indicated at 210, these parameters are adjusted to a degree that maintains tailpipe NOx below a threshold.

Figure 3:
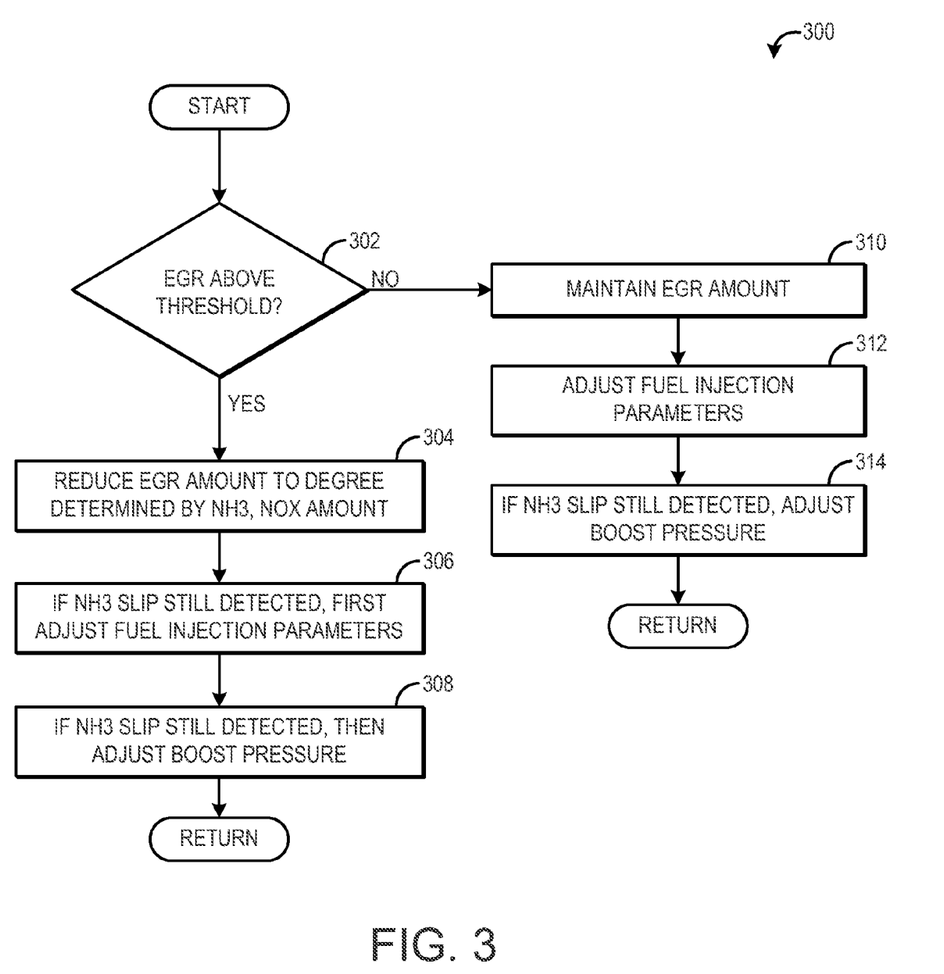
FIG. 3 is a flow chart illustrating a method for increasing engine out NOx levels according to an embodiment of the present disclosure.

Turning now to FIG. 3, a method 300 for increasing engine out NOx levels is depicted. Method 300 may be carried out by controller 12, in response to an indication to increase engine out NOx levels to mitigate ammonia slip from an SCR device. Method 300 comprises, at 302, determining if EGR is above a threshold. EGR is typically utilized to reduce NOx emissions, as the lower oxygen content of the exhaust reduces combustion temperatures. However, the lowered oxygen content of the cylinder charge may also cause combustion instability during some conditions. As such, during certain conditions, EGR may be provided to the engine at relatively low levels, or not at all. Such conditions include following a cold start, or during low speed or load conditions. If EGR is above the threshold, method 300 proceeds to 304 to reduce the amount of EGR routed to the engine. The degree to which the EGR is reduced may be based on the amount of ammonia slip. Further, the EGR may be reduced by an amount that does not cause a subsequent increase in tailpipe NOx emissions. Thus, the reduction in EGR may be a balance between reducing ammonia slip and maintaining NOx emissions below a desired threshold. At 306, if EGR has been reduced by as much as allowed and ammonia slip is still detected fuel injection quantity and/or fuel injection timing may be adjusted to further increase engine out NOx levels. At 308, if the reduction in EGR amount and adjustment to the fuel injection parameters is not sufficient to reduce the ammonia slip, then boost pressure may be adjusted to further increase engine out NOx.

Returning to 302, if EGR is not above the threshold, method 300 proceeds to 310 to maintain EGR at its current amount. Because EGR is below the threshold, a sufficient amount of EGR reduction to lower ammonia may not be possible. Instead, at 312, engine out NOx may be increased by adjusting the fuel injection parameters. Further, at 314, if ammonia slip is still detected following the adjustment to the fuel injection parameters, then the level of boost pressure may be adjusted. In doing so, ammonia slip may be reduced, even during conditions when EGR is not enabled (and hence not available as a mechanism to increase engine out NOx levels).

Thus, method 200 of FIG. 2 and method 300 of FIG. 3 provide for an engine method, comprising in response to ammonia slip past an SCR catalyst during designated conditions, if an EGR amount is above a threshold, increasing engine-out NOx emissions by first decreasing the EGR amount, and if ammonia slip is still detected upon reduction of the EGR amount, then increasing engine-out NOx emissions by adjusting fuel injection timing and/or quantity. The EGR amount may be decreased by a level dependent on the amount of ammonia slip and the amount of tailpipe NOx emissions. The level of ammonia slip may be determined by an ammonia sensor, by a NOx sensor, or predicted based on a model with inputs including exhaust temperature, mass flow, NOx levels, and reductant injection amount. If the EGR amount is above the threshold, the engine-out NOx emissions may also be increased by adjusting boost pressure. If the EGR amount is below the threshold, the engine-out NOx emissions may be increased by adjusting fuel injection timing and/or quantity, and then by adjusting boost pressure. The designated conditions may be a load on a particulate filter being below a threshold. The method includes if the designated conditions are not met, not increasing engine-out NOx emissions.

In other words, the method comprises the prediction and detection of a beginning ammonia slip and the reaction by increasing the engine output of NOx, to titrate the excess ammonia from the SCR catalyst. Such a NOx increase can be achieved by reducing or switching off engine EGR flow. The current disclosure may also substantially decrease the costs of the catalytic elements, as it renders the PGM-based ammonia slip catalyst (ASC) superfluous.

The current disclosure is explained in more detail with the following example. A numerical simulation has been performed to demonstrate the efficiency of the method. The base dosing strategy causes a significant level of $NH_3$ slip on a sequence of NEDC cycles. The NOx conversion rate is high but the level of $NH_3$ slip is not acceptable. By increasing NOx (e.g., reducing or switching off the EGR flow) when $NH_3$ slip gets detected (either a sensor or model-based), the level of $NH_3$ slip can greatly be reduced. At the same time NOx tailpipe emissions do not increase, as there is enough $NH_3$ in the catalyst to reduce this increased level of NOx.

In FIG. 4, the larger peaks (represented by the lighter line) represent examples of tailpipe ammonia slip during NEDC at nominal levels, whereas the smaller peaks (represented by the darker line) indicate ammonia slip when NOx levels are increased in response to the detected ammonia slip. Accordingly, the ammonia slip is greatly reduced when NOx levels upstream of the SCR are increased. As used in the present description, nominal may indicate a base level of ammonia and/or NOx. That is, the nominal or base level may be an amount of ammonia or NOx produced by the engine without performing the methods described herein, or may be the standard, unadjusted amount produced by the engine for the operating conditions during which the methods are carried out.

FIG. 5 shows examples of cumulative NOx during NEDC at nominal and increased levels of NOx. NOxin corresponds to engine-out levels, while NOxout corresponds to tailpipe levels. The increased NOx levels are depicted by the solid lines, in which engine-out levels (NOxin) are shown as the first, higher solid line. The nominal NOx levels are shown by the dashed lines, with the engine-out NOx as the first, higher dashed line. For both the nominal and the increased NOx levels, the tailpipe NOx levels are relatively low, as a result of NOx conversion in the SCR. Thus, even when NOx is increased to reduce ammonia slip, tailpipe NOx remains below an acceptable emissions threshold.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
in response to ammonia slip past an SCR catalyst during designated conditions,
if an EGR amount is above a threshold, increasing engine-out NOx emissions by first decreasing the EGR amount;
if ammonia slip is still detected upon reduction of the EGR amount, then increasing engine-out NOx emissions by adjusting fuel injection timing and/or quantity; and
if the EGR amount is above the threshold and if ammonia slip is detected following the adjustment in fuel injection timing and/or quantity, then increasing engine-out NOx emissions by adjusting boost pressure.

2. The engine method of claim 1, wherein the EGR amount is decreased based on feedback from an ammonia sensor positioned downstream of the SCR catalyst.

3. The engine method of claim 1, wherein the EGR amount is decreased by a level that maintains tailpipe NOx emissions below a threshold.

4. The engine method of claim 1, further comprising if the EGR amount is below the threshold, increasing engine-out NOx emissions by adjusting fuel injection timing and/or quantity.

5. The engine method of claim 1, wherein the ammonia slip is estimated based on exhaust gas temperature, exhaust mass flow, NOx levels, and reductant injection amount.

6. The engine method of claim 1, wherein the designated conditions comprise a load on a particulate filter being below a threshold, the method further comprising if the designated conditions are not met, not increasing engine-out NOx emissions.

7. An engine method, comprising:
in response to ammonia slip past an SCR catalyst while an EGR amount is above a threshold:
first increasing engine-out NOx emissions by first decreasing the EGR amount and if ammonia slip is still detected upon reduction of the EGR amount, second increasing engine-out NOx emissions by adjusting fuel injection timing and/or quantity; and then
if ammonia slip is still detected, then third increasing engine-out NOx emissions by adjusting boost pressure.

8. The engine method of claim 7, wherein the EGR amount is decreased based on feedback from an ammonia sensor positioned downstream of the SCR catalyst.

9. The engine method of claim 7, wherein the EGR amount is decreased by a level that maintains tailpipe NOx emissions below a threshold.

10. The engine method of claim 7, wherein the ammonia slip is estimated based on exhaust gas temperature, exhaust mass flow, NOx levels, and reductant injection amount.

11. The engine method of claim 7, wherein while the EGR amount is above the threshold, a load on a particulate filter is below a threshold.

* * * * *